(12) United States Patent
Ota

(10) Patent No.: US 11,041,965 B2
(45) Date of Patent: Jun. 22, 2021

(54) RADIATION-DETECTING DEVICE

(71) Applicant: HAMAMATSU PHOTONICS K.K., Hamamatsu (JP)

(72) Inventor: Ryosuke Ota, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 16/623,037

(22) PCT Filed: Jun. 19, 2018

(86) PCT No.: PCT/JP2018/023289
§ 371 (c)(1),
(2) Date: Dec. 16, 2019

(87) PCT Pub. No.: WO2018/235814
PCT Pub. Date: Dec. 27, 2018

(65) Prior Publication Data
US 2021/0116585 A1 Apr. 22, 2021

(30) Foreign Application Priority Data
Jun. 23, 2017 (JP) .............................. JP2017-123001

(51) Int. Cl.
*G01T 1/20* (2006.01)
*G01T 1/29* (2006.01)

(52) U.S. Cl.
CPC .......... *G01T 1/2006* (2013.01); *G01T 1/2985* (2013.01)

(58) Field of Classification Search
CPC ............................ G01T 1/2006; G01T 1/2985
See application file for complete search history.

(56) References Cited

U.S. PATENT DOCUMENTS 5,517,544 A * 5/1996 Levinson .............. G01T 1/2985
378/4
6,297,506 B1 10/2001 Young et al.
(Continued)

FOREIGN PATENT DOCUMENTS

JP   S58-30628 A    2/1983
JP   2009-17387 A   1/2009
(Continued)

OTHER PUBLICATIONS

Chang, Chen-Ming et al., "Time-over-threshold for pulse shape discrimination in a time-of-flight phoswich PET detector," Phys. Med. Biol., 62, 2017, pp. 258-271.
(Continued)

*Primary Examiner* — Blake C Riddick
(74) *Attorney, Agent, or Firm* — Faegre Drinker Biddle & Reath LLP

(57) ABSTRACT

A radiation detection device includes a scintillator, a photodetector for detecting scintillation light from the scintillator and outputting a detection signal, a first comparator for comparing the detection signal with a first threshold voltage V1 and outputting a signal having a first time width T1, a first time width measurement device for measuring the first time width T1, a second comparator for comparing the detection signal with a second threshold voltage V2 and outputting a signal having a second time width T2, a second time width measurement device for measuring the second time width T2, and an analysis unit for obtaining a time constant τ indicating a time waveform of the detection signal based on the first and second time widths T1 and T2.

9 Claims, 17 Drawing Sheets

(56) References Cited

U.S. PATENT DOCUMENTS

| | | | |
|---|---|---|---|
| 6,392,236 B1* | 5/2002 | Maekawa | G01T 1/2008 250/369 |
| 9,182,500 B2 | 11/2015 | Wang et al. | |
| 2003/0033097 A1* | 2/2003 | Tanaka | G01T 1/171 702/60 |
| 2007/0051892 A1* | 3/2007 | Warburton | G01T 1/2928 250/362 |
| 2007/0051893 A1* | 3/2007 | Matsumoto | G01T 1/2928 250/370.01 |
| 2009/0236532 A1* | 9/2009 | Frach | G01T 1/2985 250/363.04 |
| 2011/0215254 A1* | 9/2011 | Takahashi | G01T 1/2018 250/394 |
| 2012/0184848 A1* | 7/2012 | Ohi | A61B 6/4258 600/436 |
| 2012/0298875 A1* | 11/2012 | Ueno | G01T 1/17 250/362 |
| 2013/0277565 A1 | 10/2013 | Bogorodzki et al. | |
| 2014/0052414 A1* | 2/2014 | Xie | G01T 1/17 702/189 |
| 2014/0209804 A1 | 7/2014 | Lee et al. | |
| 2015/0085985 A1* | 3/2015 | Funaki | H04N 5/378 378/98 |
| 2016/0077148 A1* | 3/2016 | Kimura | G01T 1/171 702/58 |
| 2016/0282487 A1* | 9/2016 | Kawata | G01T 1/208 |
| 2016/0370475 A1* | 12/2016 | Kawata | G01T 1/17 |
| 2017/0119325 A1* | 5/2017 | Tamura | A61B 6/4241 |
| 2018/0070906 A1* | 3/2018 | Terui | A61B 6/54 |
| 2018/0252823 A1* | 9/2018 | Ishikawa | G01T 1/2018 |

FOREIGN PATENT DOCUMENTS

| | | |
|---|---|---|
| JP | 2009-500608 A | 1/2009 |
| JP | 2010-169516 A | 8/2010 |
| JP | 2010-193483 A | 9/2010 |
| JP | 5531021 B2 | 6/2014 |
| JP | 2014-160042 A | 9/2014 |
| WO | WO-2007/005442 A2 | 1/2007 |
| WO | WO-2012/011506 A1 | 1/2012 |

OTHER PUBLICATIONS

International Preliminary Report on Patentability dated Jan. 2, 2020 for PCT/JP2018/023289.

Takeshi Fujiwara et al., "Multi-Level Time-Over-Threshold Method for Energy Resolving Multi-Channel Systems", IEEE Transactions on Nuclear Science, IEEE Service Center, New York, NY, US, vol. 57, No. 5, Oct. 1, 2010, p. 2545-p. 2548, XP011319754.

Gaudin Emilie et al., "Performance characterization of a dual-threshold time-over-threshold APD-based detector front-end module for PET imaging", 2015 IEEE Nuclear Science Symposium and Medical Imaging Conference (NSS/MIC), IEEE, Oct. 31, 2015, p. 1-p. 3, XP032973711.

* cited by examiner

*Fig.5*

| SCINTILLATOR | RISE TIME τr(ns) | FALL TIME τd(ns) |
|---|---|---|
| LSO:Ce | 0.079 | 39.6 |
| LYSO:Ce | 0.089 | 43 |
| LaBr3:Ce | 0.28 | 15.4 |
| GSO:Ce | 6 | 65 |
| GAGG:Ce | 4.6 | 95 |

RADIATION-DETECTING DEVICE

TECHNICAL FIELD

The present invention relates to a radiation detection device used for detecting a radiation ray.

BACKGROUND ART

In a positron emission tomography (PET) apparatus, a substance labeled with a radioisotope (RI) that emits positrons is applied to a subject as a tracer. Then, a radiation detector measures a pair of γ-rays generated by annihilation of the positron emitted from the RI substance and the electron in the normal substance, thereby obtaining information about the subject.

In a measurement apparatus, such as the PET apparatus, a radiation detector used for detecting radiation rays, such as γ-rays, is appropriately configured by combining, for example, a scintillator that generates scintillation light in response to incidence of a radiation ray and a photodetector that detects the scintillation light and outputs a detection signal (see, for example, Patent Document 1).

CITATION LIST

Patent Literature

Patent Document 1: Japanese Patent Application Laid-Open Publication No. 2014-160042
Patent Document 2: Japanese Patent Publication No. 5531021

Non Patent Literature

Non Patent Document 1: Chen-Ming Chang et al., "Time-over-threshold for pulse shape discrimination in a time-of-flight phoswich PET detector", Phys. Med. Biol. Vol. 62 (2017) pp. 258-271

SUMMARY OF INVENTION

Technical Problem

In a radiation detector used in a PET apparatus, it is important to determine at which position the γ-ray incident on the detector has interacted with a scintillator and detected. In particular, when the γ-ray is detected at a position around the visual field of the detector (a position away from the center), a parallax error occurs and causes a problem that the spatial resolution of γ-ray detection is lowered. In order to prevent the spatial resolution of radiation detection from being lowered, a phoswich type detector has been proposed.

In the phoswich type radiation detector, a scintillator used for radiation detection is configured by stacking two types of scintillator units having detection signal time constants different from each other. With this configuration, it is possible to determine which scintillator unit detects the radiation ray, based on information on the time waveform of the detection signal, for example, the time constant of the time waveform. This phoswich type detector can be used as a depth of interaction (DOI) detector.

As a method for obtaining a parameter indicating a time waveform, such as a time constant of a detection signal output from a detector, for example, a configuration in which waveform sampling for the time waveform of the detection signal is performed can be used. However, with the configuration of performing the waveform sampling of the detection signal, while a lot of information on the detection signal is obtained, it is unsuitable for radiation measurement at a high count rate, and power consumption is hardly reduced.

Further, Patent Document 2 and Non Patent Document 1 disclose the configurations in which the detection signal is compared with a threshold voltage, and a time during which the voltage value of the signal exceeds the threshold voltage (Time over Threshold: ToT) is obtained. However, with these configurations, the time constant itself of the detection signal is not obtained, and it is difficult to determine the time waveform of the detection signal with sufficient accuracy. Further, the problem of acquisition and determination of such information on the time waveform of the detection signal similarly occurs in radiation detectors other than the phoswich type detector described above.

The present invention has been made to solve the above problem, and an object thereof is to provide a radiation detection device capable of appropriately acquiring and determining information on a time waveform of a detection signal output from a radiation detector including a scintillator and a photodetector.

Solution to Problem

A radiation detection device according to the present invention includes (1) a scintillator for generating scintillation light in response to incidence of a radiation ray, (2) a photodetector for detecting the scintillation light output from the scintillator and outputting a detection signal, (3) a first comparator for comparing the detection signal with a first threshold voltage and outputting a first digital signal having a first time width corresponding to a time during which a voltage value of the detection signal exceeds the first threshold voltage, (4) a first time width measurement device for measuring the first time width of the first digital signal, (5) a second comparator for comparing the detection signal with a second threshold voltage different from the first threshold voltage and outputting a second digital signal having a second time width corresponding to a time during which the voltage value of the detection signal exceeds the second threshold voltage, (6) a second time width measurement device for measuring the second time width of the second digital signal, and (7) an analysis unit for obtaining a time constant indicating a time waveform of the detection signal based on the first time width and the second time width.

In the above radiation detection device, the first comparator and the second comparator in which threshold voltages different from each other are set are provided for the detection signal output from the radiation detector including the scintillator and the photodetector. Then, the different time widths of the first and second digital signals output from the two comparators are measured by the first and second time width measurement devices, and the time constant which is a parameter indicating the time waveform of the detection signal in response to the radiation detection is obtained based on the obtained first time width and second time width. With this configuration, it is possible to appropriately acquire and determine information on the time waveform of the detection signal with a simple configuration.

Advantageous Effects of Invention

According to a radiation detection device of the present invention, by providing, for a detection signal output from a radiation detector including a scintillator and a photodetector, first and second comparators in which different threshold voltages are set, measuring time widths of first and second digital signals output from the comparators with first and second time width measurement devices, and obtaining, based on the obtained first and second time widths, a time constant indicating the time waveform of the detection signal, it is possible to appropriately acquire and determine information on the time waveform of the detection signal with a simple configuration.

BRIEF DESCRIPTION OF DRAWINGS

FIG. 5 is a table showing rise times and fall times of time waveforms of scintillation light output from scintillators.

DESCRIPTION OF EMBODIMENTS

Figure 1:
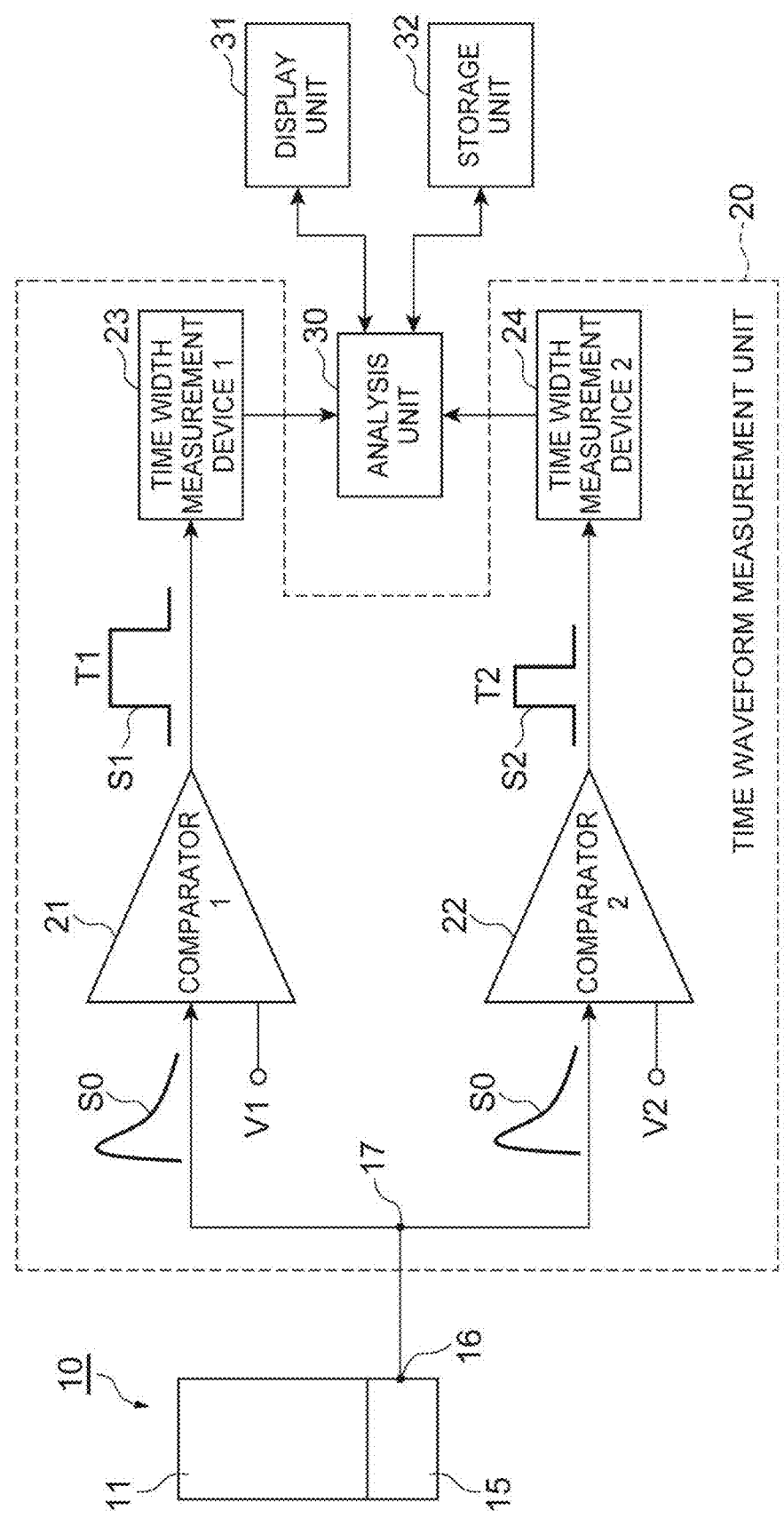
FIG. 1 is a diagram schematically illustrating a configuration of a radiation detection device of a first embodiment.

Hereinafter, embodiments of a radiation detection device according to the present invention will be described in detail with reference to the drawings. In the description of the drawings, the same elements will be denoted by the same reference signs, without redundant description. Further, the dimensional ratios in the drawings are not always coincident with those in the description.

FIG. 1 is a diagram schematically illustrating a configuration of a radiation detection device of a first embodiment. A radiation detection device 1A according to the present embodiment includes a radiation detector 10, a time waveform measurement unit 20, and an analysis unit 30.

The radiation detector 10 detects an incident radiation ray and outputs a generated electric signal (voltage signal) as a detection signal. The radiation detector 10 in this configuration example includes a scintillator 11 and a photodetector 15. The scintillator 11 is made of a predetermined scintillation material, and generates scintillation light in response to incidence of a radiation ray to be detected. The time waveform of the scintillation light generated in the scintillator 11 is a predetermined waveform determined depending on the light emission characteristics of the scintillation material. Further, the radiation ray to be detected by the scintillator 11 is, for example, a γ ray, an X ray, an electron, a charged particle, a cosmic ray, or the like.

The photodetector 15 detects the scintillation light output from the scintillator 11 and outputs a detection signal. As the photodetector 15, for example, a photomultiplier tube (PMT), a silicon photomultiplier (SiPM), a multi-pixel photon counter (MPPC), or the like can be used. Further, if the output from the photodetector 15 is a current signal, it is preferable to perform current voltage conversion with an amplifier or the like to generate a detection signal that is a voltage signal. The time waveform of the detection signal is a predetermined waveform determined depending on the time waveform of the scintillation light described above, the light detection characteristics of the photodetector 15, and the like. A detection signal S0 generated by the photodetector 15 is output from the output terminal 16 to the time waveform measurement unit 20 of the subsequent stage.

The time waveform measurement unit 20 is a measurement circuit unit that measures the time waveform of the detection signal S0 output from the output terminal 16 of the photodetector 15. The time waveform measurement unit 20 in the present configuration example includes a first comparator 21, a second comparator 22, a first time width measurement device 23, and a second time width measurement device 24. The detection signal S0 output from the photodetector 15 is branched at a branch point 17, and the branched detection signals S0 are respectively input to the first comparator 21 and the second comparator 22.

To the first comparator 21, a first threshold voltage V1 is applied. The first comparator 21 compares the detection signal S0, which is a voltage signal, with the first threshold voltage V1, and outputs a first digital signal S1 having a first time width T1 corresponding to a time during which the voltage value of the detection signal S0 exceeds the threshold voltage V1. Further, to the second comparator 22, a second threshold voltage V2 having a voltage value different from that of the first threshold voltage V1 is applied. The second comparator 22 compares the detection signal S0 with the second threshold voltage V2, and outputs a second digital signal S2 having a second time width T2 corresponding to a time during which the voltage value of the detection signal S0 exceeds the threshold voltage V2.

The first time width measurement device 23 measures the first time width T1 of the first digital signal S1 output from the first comparator 21, and outputs the obtained data on the first time width T1 to the analysis unit 30 of the subsequent stage. Further, the second time width measurement device 24 measures the second time width T2 of the second digital signal S2 output from the second comparator 22, and outputs the obtained data on the second time width T2 to the analysis unit 30. Each of the first time width measurement device 23 and the second time width measurement device 24 is preferably configured by a time to digital converter (TDC).

The analysis unit (analysis device) 30 obtains, based on the first time width T1 and the second time width T2 respectively input from the first and second time width measurement devices 23 and 24, a time constant τ, which is a parameter indicating the time waveform of the detection signal S0. The time constant τ is, for example, a fall time τd of the time waveform of the detection signal S0 to be described later. Further, the analysis unit 30 may obtain, as the time constant τ, a parameter indicating the time waveform other than the fall time τd. Further, the analysis unit 30 may further obtain a pulse height E of the time waveform of the detection signal S0 based on the time constant τ as necessary. As the analysis unit 30, a computer including a CPU and a memory, a field programmable gate array (FPGA), or the like can be used, for example.

A display unit (display device) 31 and a storage unit (storage device) 32 are connected to the analysis unit 30. The display unit 31 displays an analysis result of the detection signal S0 by the analysis unit 30, such as the time constant τ derived as described above, as necessary. The storage unit 32 stores data on the first and second time widths T1 and T2 input to the analysis unit 30, data on the analysis result, such as the time constant τ derived by the analysis unit 30, and the like.

The effect of the radiation detection device 1A according to the above embodiment is described.

In the radiation detection device 1A illustrated in FIG. 1, the first comparator 21 and the second comparator 22 in which the threshold voltages V1 and V2 different from each other are set are provided for the detection signal S0 output from the radiation detector 10 including the scintillator 11 and the photodetector 15. Then, different time widths of the first and second digital signals S1 and S2 respectively output from the two comparators 21 and 22 are measured by the first and second time width measurement devices 23 and 24, and the time constant τ indicating the time waveform of the detection signal S0 in response to the radiation detection is obtained by the analysis unit 30 based on the obtained first time width T1 and second time width T2. With this configuration, it is possible to appropriately acquire and determine information on the time waveform of the detection signal S0 with a simple configuration without performing waveform sampling or the like.

Further, in the above detection device 1A, the analysis unit 30 may further obtain, based on the time constant τ, the pulse height E of the time waveform of the detection signal S0 in addition to the time constant τ. With this configuration, it is possible to easily obtain the pulse height E of the detection signal S0 at high speed with low power consumption without providing a pulse height measurement device, such as an analog to digital converter (ADC), separately from the time waveform measurement unit 20 including the comparators 21 and 22 and the time width measurement devices 23 and 24. In addition, the pulse height E may not be obtained if unnecessary.

Figure 2:
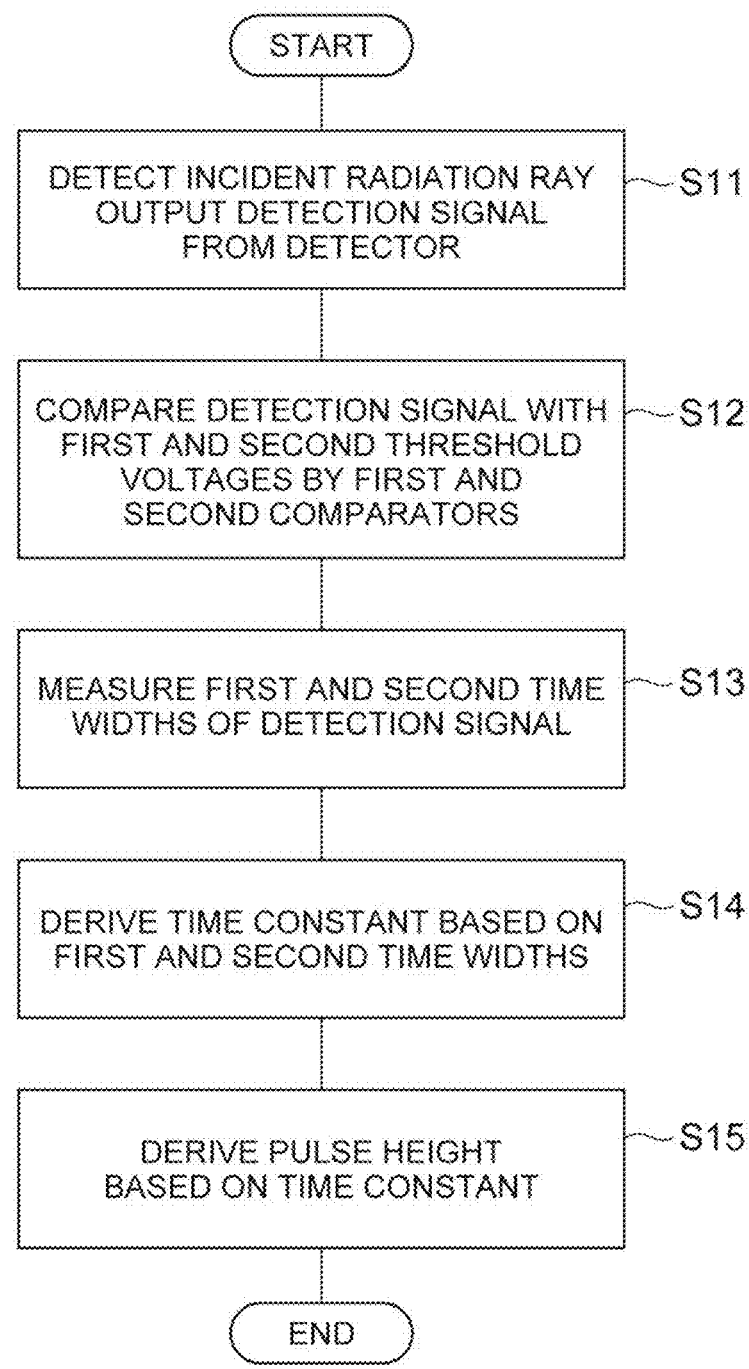
FIG. 2 is a flowchart illustrating a radiation detection method in the detection device illustrated in FIG. 1.
Figure 3:
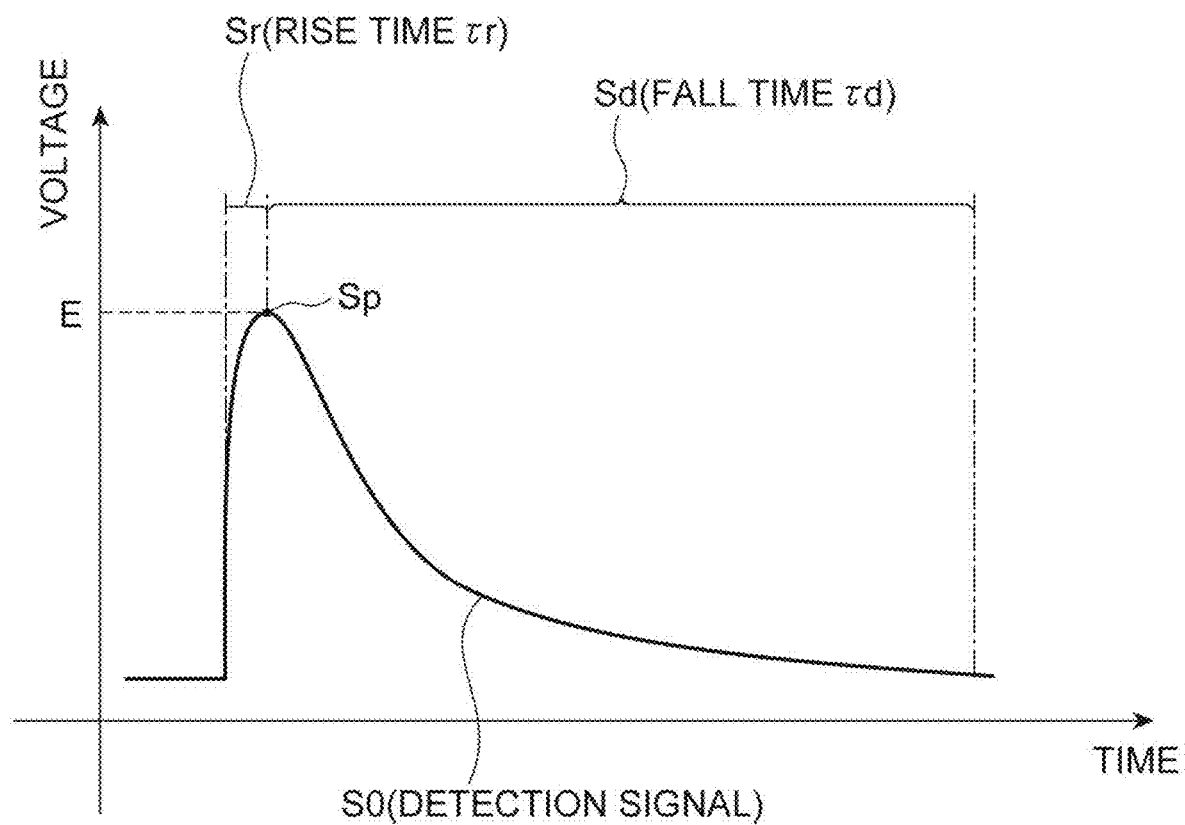
FIG. 3 is a graph illustrating a time waveform of a detection signal output from a photodetector.
Figure 4:
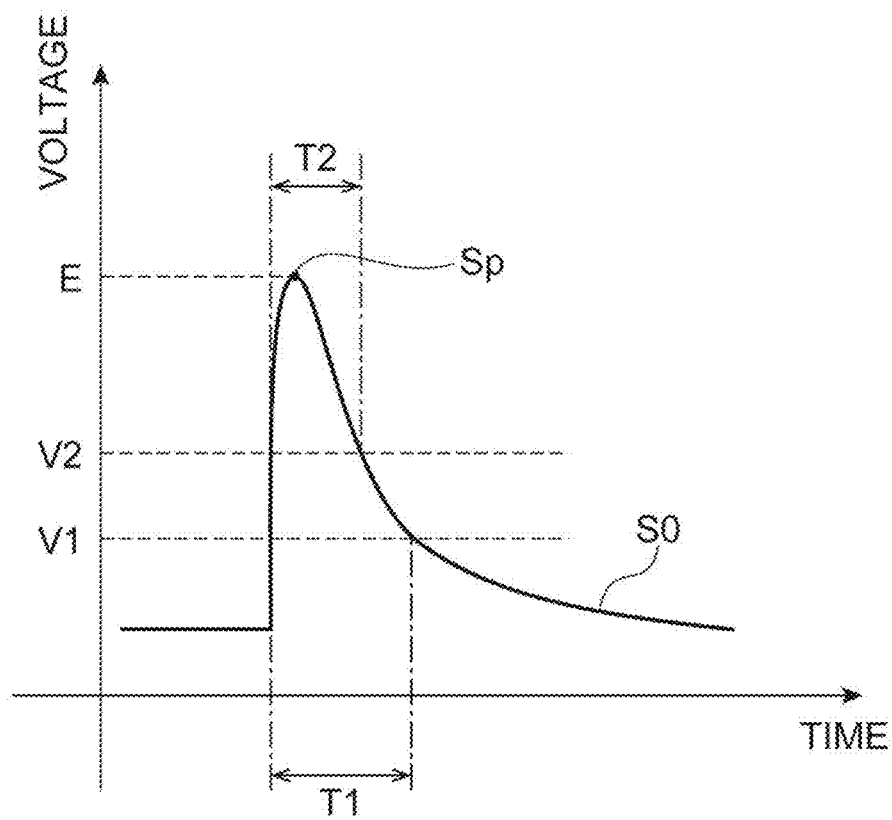
FIG. 4 is a graph illustrating first and second time widths of a detection signal.

FIG. 2 is a flowchart illustrating a radiation detection method performed in the radiation detection device 1A illustrated in FIG. 1. Further, FIG. 3 is a graph illustrating the time waveform of the detection signal S0 output from the photodetector 15. Further, FIG. 4 is a graph illustrating the first and second time widths T1 and T2 obtained by applying the first and second threshold voltages V1 and V2 to the detection signal S0. In the following, a radiation detection method according to the present embodiment will be described together with specific examples of the time waveform of the detection signal S0 and a method of deriving the time constant τ and the like.

In the radiation detection method illustrated in FIG. 2, first, a radiation ray is detected by the radiation detector 10 including the scintillator 11 and the photodetector 15, and a detection signal S0 is output from the output terminal 16 of the photodetector 15 in response to the incidence of the radiation ray (step S11). FIG. 3 schematically illustrates an example of the time waveform of the detection signal S0 output from the photodetector 15. In the graph of FIG. 3, the horizontal axis indicates time, and the vertical axis indicates the voltage value of the detection signal S0.

In the time waveform of the detection signal S0 illustrated in FIG. 3, the part before a signal peak Sp is a signal rising part Sr, and the part after the signal peak Sp is a signal falling part Sd. Further, the time waveform of the detection signal S0 having a shape illustrated in FIG. 3 can be expressed by, for example, the following Formula (1).

[Formula 1]

$$f(t) = E\left(1 + \frac{\tau_d}{\tau_r}\right)^{\tau_r/\tau_d} \left\{1 - \left(\frac{\tau_d}{\tau_r}\right)^{-1}\right\}^{-1} e^{-\frac{t}{\tau_d}} \left(1 - e^{-\frac{t}{\tau_r}}\right) \quad (1)$$

Here, in Formula (1), E represents a pulse height that is a voltage value at the signal peak Sp, τr represents a rise time (rise time constant) of the signal rising part Sr, and τd represents a fall time (fall time constant) of the signal falling part Sd.

The detection signal S0 output from the radiation detector 10 is input to the first and second comparators 21 and 22 in the time waveform measurement unit 20. The first comparator 21 compares the detection signal S0 with the first threshold voltage V1 and outputs the first digital signal S1 having the first time width T1 corresponding to a time during which the voltage value of the detection signal S0 exceeds the threshold voltage V1, as illustrated in the graph of FIG. 4. Further, the second comparator 22 compares the detection signal S0 with the second threshold voltage V2 and similarly outputs the second digital signal S2 having the second time width T2 corresponding to a time during which the voltage value of the detection signal S0 exceeds the threshold voltage V2 (step S12). The first and second time widths T1 and T2 are respectively measured by the first and second time width measurement devices 23 and 24 (step S13).

In addition, FIG. 3 and FIG. 4 illustrate that the signal peak Sp of the time waveform of the detection signal S0 is in the positive direction with respect to the voltage, but if the signal peak Sp of the detection signal S0 is in the negative direction with respect to the voltage, the time width is only required to be, for example, a time width corresponding to a time during which the voltage value of the detection signal S0 the positive/negative of which is inverted exceeds the threshold voltage. This corresponds to a time during which the voltage value of the original detection signal is below the threshold voltage.

The analysis unit 30 derives the time constant τ indicating the time waveform of the detection signal S0 based on the first and second time widths T1 and T2 and the like measured by the first and second time width measurement devices 23 and 24 (step S14). Further, the analysis unit 30 derives the pulse height E of the time waveform of the detection signal S0 based on the first and second time widths T1 and T2, the time constant τ, and the like, as necessary (step S15).

Here, in the time waveform of the detection signal S0 output from the photodetector 15, if the rise time τr is sufficiently shorter than the fall time τd, the first time width T1 of the detection signal S0 for the first threshold voltage V1 is expressed by the following Formula (2).

[Formula 2]
$$T1 = \tau_d \log \frac{E}{V1} \quad (2)$$

Further, the second time width T2 of the detection signal S0 for the second threshold voltage V2 is similarly expressed by the following Formula (3).

[Formula 3]
$$T2 = \tau_d \log \frac{E}{V2} \quad (3)$$

Thus, when the time constant τ derived by the analysis unit 30 as a parameter of the time waveform is the fall time τd of the time waveform of the detection signal S0, the time constant τ can be obtained with the following Formula (4).

[Formula 4]

$$\tau = \tau_d = (T1 - T2)/\log(V2/V1) \quad (4)$$

With Formula (4), it is possible to appropriately easily obtain the time constant τ of the detection signal S0.

Further, when the analysis unit 30 obtains the pulse height E of the detection signal S0 in addition to the time constant τ, the pulse height E can be obtained with the following Formula (5) using the fall time τd obtained as the time constant τ.

[Formula 5]
$$E = V1 \exp \frac{T1}{\tau_d} = V2 \exp \frac{T2}{\tau_d} \quad (5)$$

In addition, the first and second threshold voltages V1 and V2 in the first and second comparators 21 and 22 can be arbitrarily set and adjusted so as to easily obtain the time constant τ and the like.

Further, regarding the above waveform condition that the rise time τr is sufficiently shorter than the fall time τd in the detection signal S0, specifically, it is preferable that, for example, the rise time τr of the time waveform of the detection signal S0 with the fall time τd satisfies the following condition.

(τr/τd)<0.1

Here, FIG. 5 is a table showing rise times τr and fall times τd of time waveforms of scintillation light output from scintillators. FIG. 5 shows rise times τr and fall times τd of time waveforms of existing scintillators of LSO, LYSO, LaBr3, GSO, and GAGG used in PET apparatuses. These scintillators are considered to sufficiently satisfy the above condition that the rise time τr is sufficiently shorter than the fall time τd.

Figure 6:
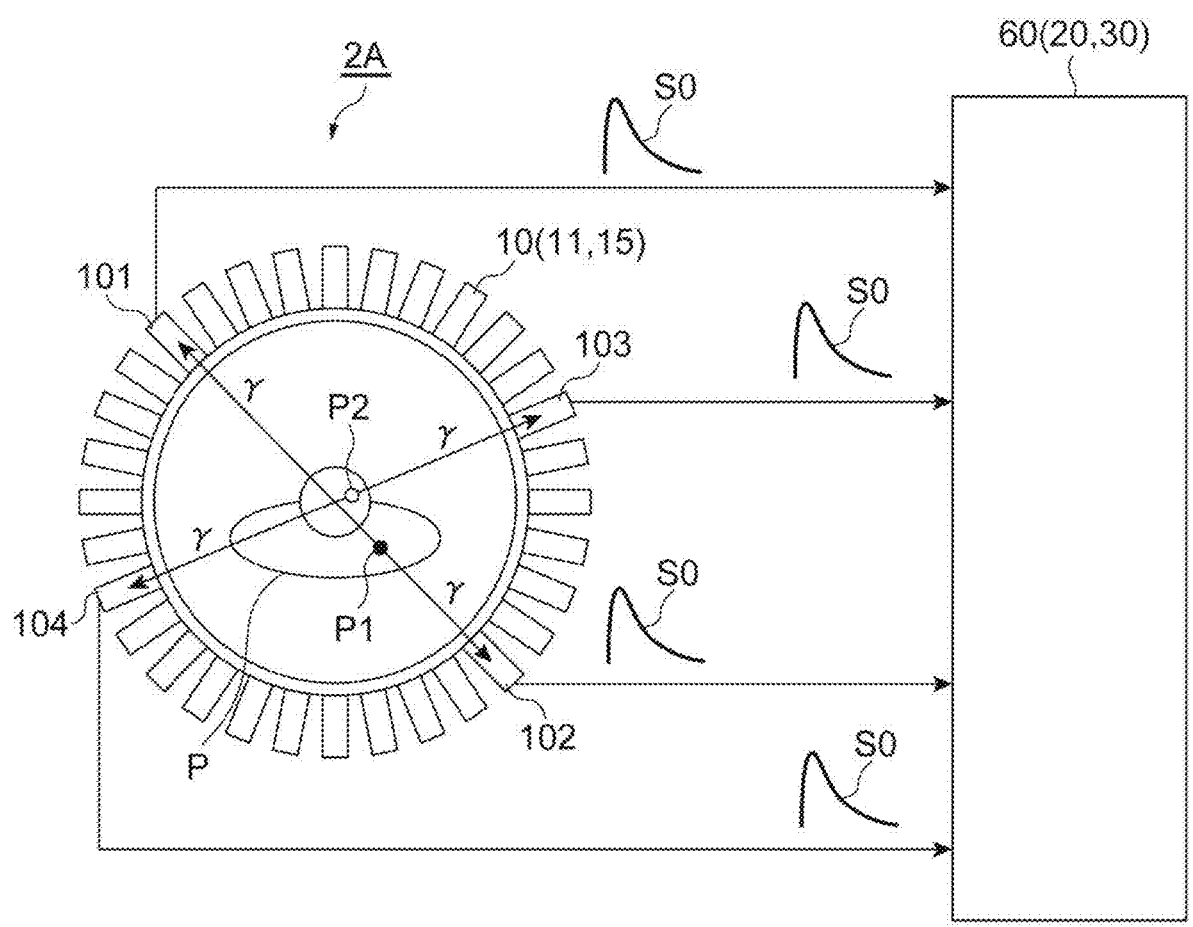
FIG. 6 is a diagram illustrating a configuration of a PET apparatus using the detection device illustrated in FIG. 1.

The radiation detection device 1A having the configuration illustrated in FIG. 1 can be suitably applied to, for example, a PET apparatus. FIG. 6 is a diagram illustrating a configuration of a PET apparatus to which the radiation detection device illustrated in FIG. 1 is applied. A PET apparatus 2A is configured by arranging a plurality of radiation detectors 10 each including the scintillator 11 and the photodetector 15 so as to surround a subject P. Further, for the detection signal S0 output from each radiation detector 10, a signal processing unit 60 including the time waveform measurement unit 20 and the analysis unit 30 illustrated in FIG. 1 is provided.

In the PET apparatus 2A, a pair of γ rays generated by annihilation of the positron inside the subject P is detected by the radiation detectors 10. In the example illustrated in FIG. 6, a pair of γ rays generated at a measurement point P1 inside the subject P is detected by radiation detectors 101 and 102. Further, a pair of γ rays generated at a measurement point P2 is detected by radiation detectors 103 and 104.

The detection signal S0 output from the radiation detector 10 is input to the signal processing unit 60, and the signal processing unit 60 measures the first and second time widths T1 and T2 of the detection signal S0 and derives the time constant τ of the time waveform, as described above with reference to FIG. 1. Further, based on the obtained time constant τ, the characteristics of the radiation detector 10, such as the characteristics of the scintillator 11, are derived. Information on the derived characteristic of the radiation detector 10 can be used, for example, to improve the performance of the PET apparatus 2A.

Figure 7:
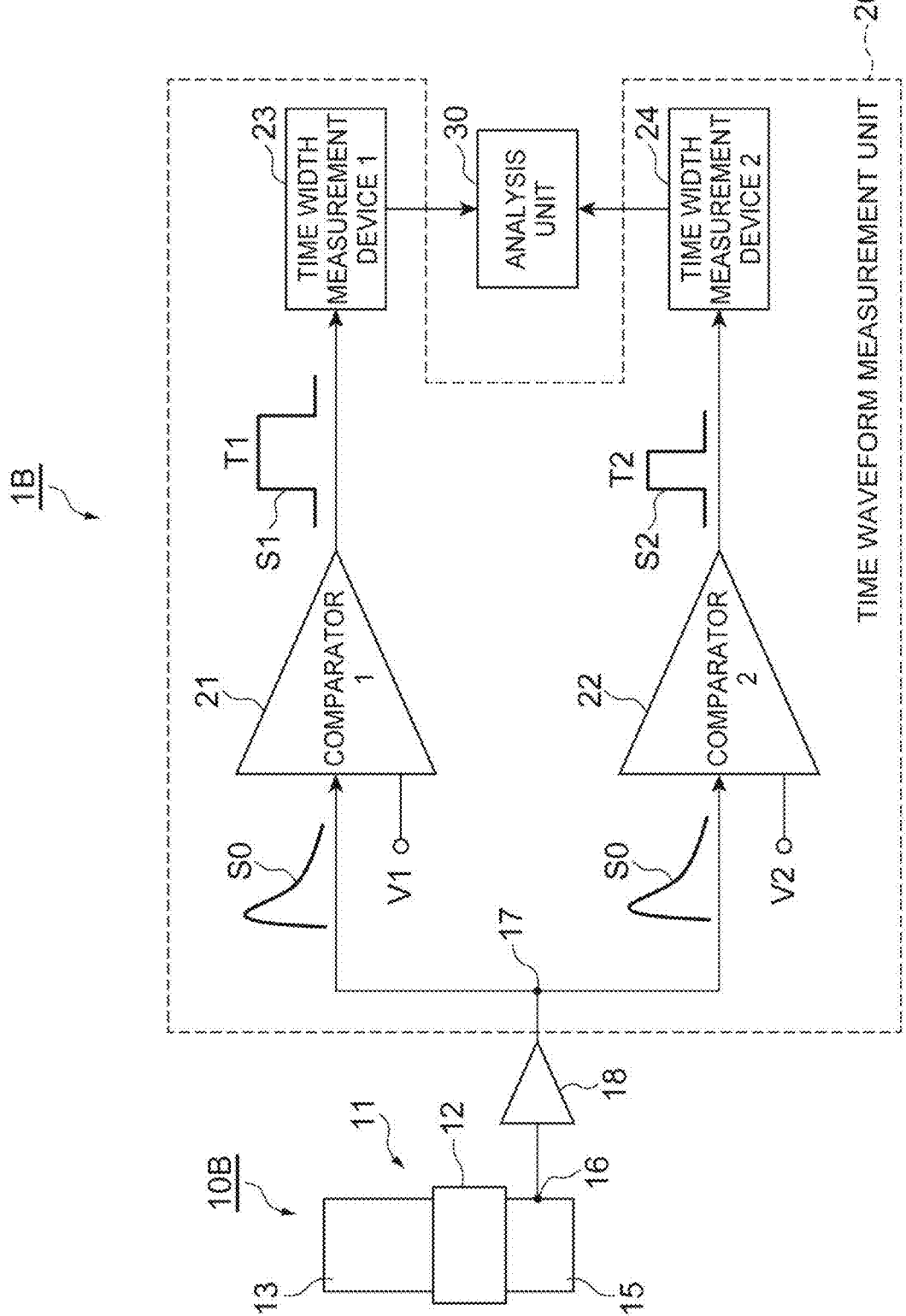
FIG. 7 is a diagram schematically illustrating a configuration of a radiation detection device of a second embodiment.

FIG. 7 is a diagram schematically illustrating a configuration of a radiation detection device of a second embodiment. A radiation detection device 1B according to the present embodiment includes a radiation detector 10B, a time waveform measurement unit 20, and an analysis unit 30. Among these, the configurations of the time waveform measurement unit 20 and the analysis unit 30 are similar to those illustrated in FIG. 1. Further, in FIG. 7, a display unit 31 and a storage unit 32 connected to the analysis unit 30 are not illustrated.

The radiation detector 10B in this configuration example includes a scintillator 11 and a photodetector 15. Further, the scintillator 11 is configured by arranging a first scintillator unit 12 and a second scintillator unit 13 in this order from the photodetector 15.

The first scintillator unit 12 is made of a first scintillation material, and generates scintillation light having a predetermined time waveform in response to incidence of a radiation ray. The second scintillator unit 13 is made of a second scintillation material different from the first scintillation material, and generates scintillation light having a time waveform different from that of the first scintillator unit 12 in response to incidence of a radiation ray. The photodetector 15 detects the scintillation light output from the first scintillator unit 12 or the second scintillator unit 13, and outputs a detection signal S0 via the output terminal 16 and an amplifier 18. At this time, the time waveform of the detection signal S0 output from the photodetector 15 varies depending on whether the detected radiation ray has interacted with the first scintillator unit 12 or the second scintillator unit 13.

Figure 8:
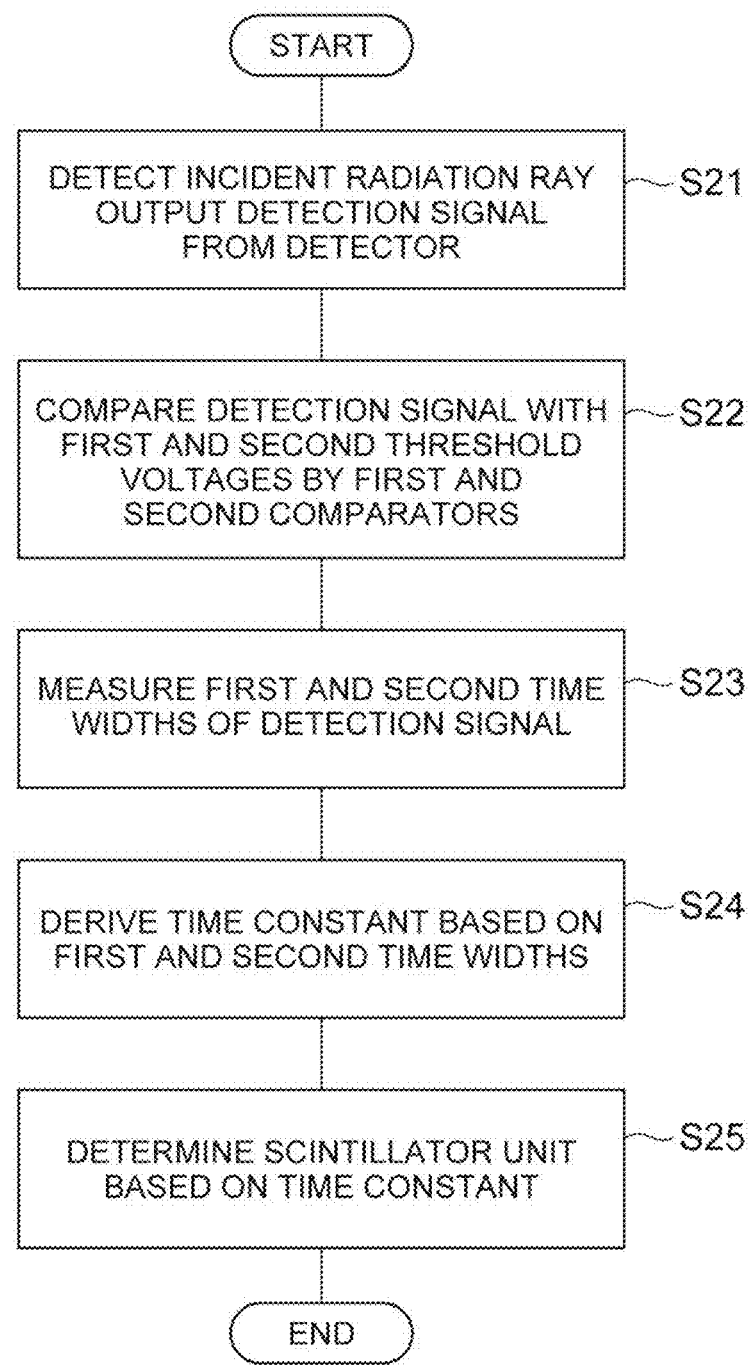
FIG. 8 is a flowchart illustrating a radiation detection method in the detection device illustrated in FIG. 7.

FIG. 8 is a flowchart illustrating a radiation detection method performed in the radiation detection device 1B illustrated in FIG. 7. In the radiation detection method illustrated in FIG. 8, first, a radiation ray is detected by the radiation detector 10B constituted by the scintillator 11 including the first and second scintillator units 12 and 13, and the photodetector 15, and the detection signal S0 is output from the output terminal 16 of the photodetector 15 (step S21).

The detection signal S0 is input to the first and second comparators 21 and 22 in the time waveform measurement unit 20 via the amplifier 18 and the branch point 17. The first comparator 21 compares the detection signal S0 with the first threshold voltage V1 and outputs the first digital signal S1 having the first time width T1. Further, the second comparator 22 compares the detection signal S0 with the second threshold voltage V2 and outputs the second digital signal S2 having the second time width T2 (step S22). The first and second time widths T1 and T2 are respectively measured by the first and second time width measurement devices 23 and 24 (step S23).

The analysis unit 30 derives the time constant τ indicating the time waveform of the detection signal S0 based on the first and second time widths T1 and T2 measured by the first and second time width measurement devices 23 and 24 (step S24). Further, the analysis unit 30 determines, based on the obtained time constant τ, whether the detection signal S0 output from the photodetector 15 is caused by scintillation light generated in the first scintillator unit 12 or the second scintillator unit 13, that is, whether the radiation ray is detected by the first scintillator unit 12 or the second scintillator unit 13 (step S25).

In this manner, with the configuration for obtaining the time constant τ of the detection signal S0 based on the first and second time widths T1 and T2 as described above, it is possible to determine, based on the obtained time constant τ, whether the radiation ray is detected by the first scintillator unit 12 or the second scintillator unit 13, in the case where the scintillator 11 includes the first and second scintillator units 12 and 13. Further, it is possible to similarly perform such determination of the scintillator unit when the scintillator includes three or more scintillator units.

Figure 9:
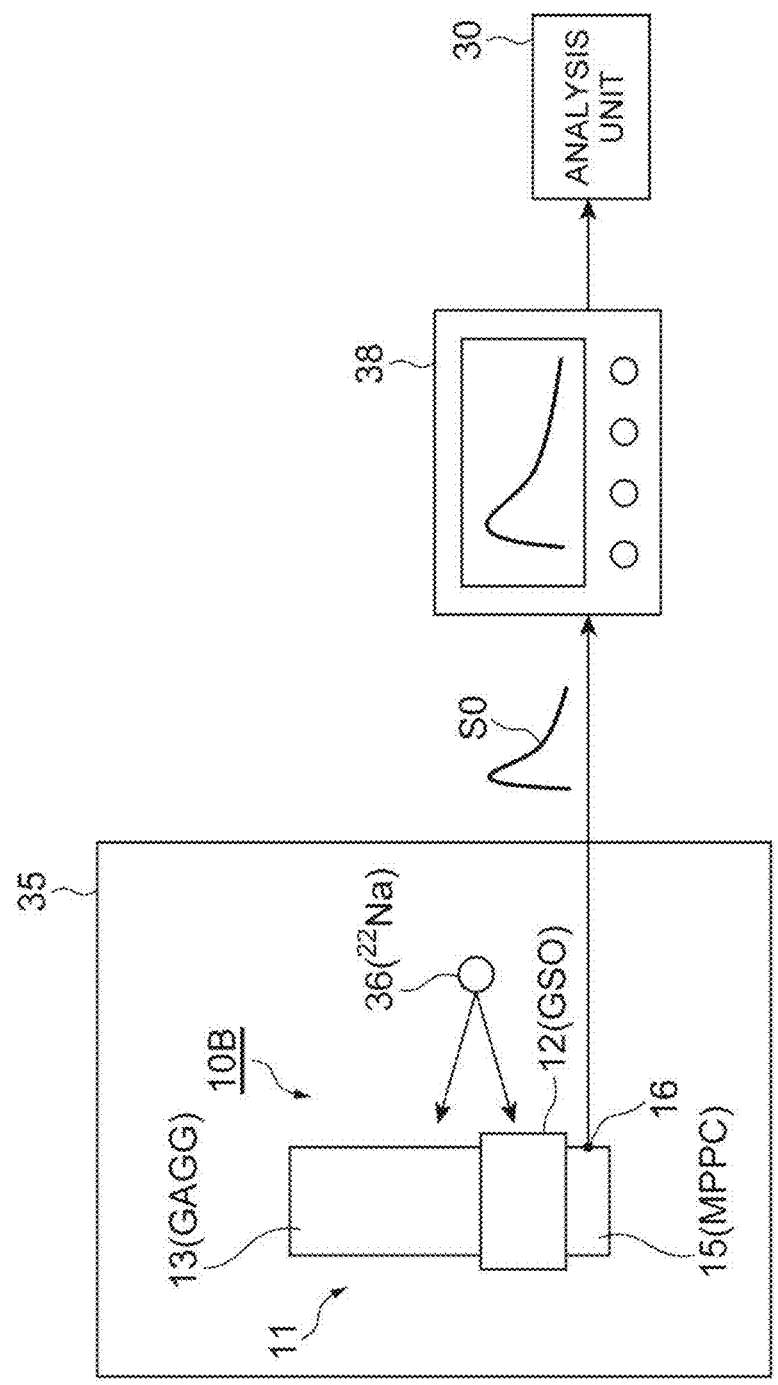
FIG. 9 is a diagram illustrating a measurement experiment performed using a radiation detector illustrated in FIG. 7.

A measurement experiment on the determination of the scintillator units based on the time constant τ of the detection signal S0 was performed. FIG. 9 is a diagram illustrating a measurement experiment performed using the radiation detector 10B illustrated in FIG. 7. In this measurement experiment, the radiation detector 10B was placed in a thermostatic chamber 35 at a temperature of 25° C. Regarding the configuration of the radiation detector 10B, a 5×5×5 mm$^3$ GSO scintillator was used as the first scintillator unit 12, and a 3×3×10 mm$^3$ GAGG scintillator was used as the second scintillator unit 13.

Further, S13360-3050 manufactured by Hamamatsu Photonics was used as the MPPC of the photodetector 15. The light receiving surface size of this MPPC is 3.0×3.0 mm$^2$, and the array pitch of a plurality of photodetection pixels arrayed two-dimensionally is 50 μm. Further, regarding the voltage applied to the MPPC, the voltage exceeding the breakdown voltage was set to $V_{excess}$=4.0 V. Further, a $^{22}$Na radiation source was disposed as a radiation source 36 at a position separated by 5 cm from the scintillator 11 including the first and second scintillator units 12 and 13, and the γ rays from the radiation source 36 were detected by the radiation detector 10B.

Further, in this measurement experiment, an oscilloscope 38 instead of the time waveform measurement unit 20 illustrated in FIG. 7 was provided for the detection signal S0 output from the output terminal 16 of the photodetector 15, and the time waveform data measured by the oscilloscope 38 was taken into the computer (PC) of the analysis unit 30, and then the first and second time widths T1 and T2, the time constant τ and the like of the time waveform of the detection signal S0 were analyzed by software. Further, as the oscilloscope 38, DSO-S404A manufactured by Keysight Corporation was used.

Figure 10:
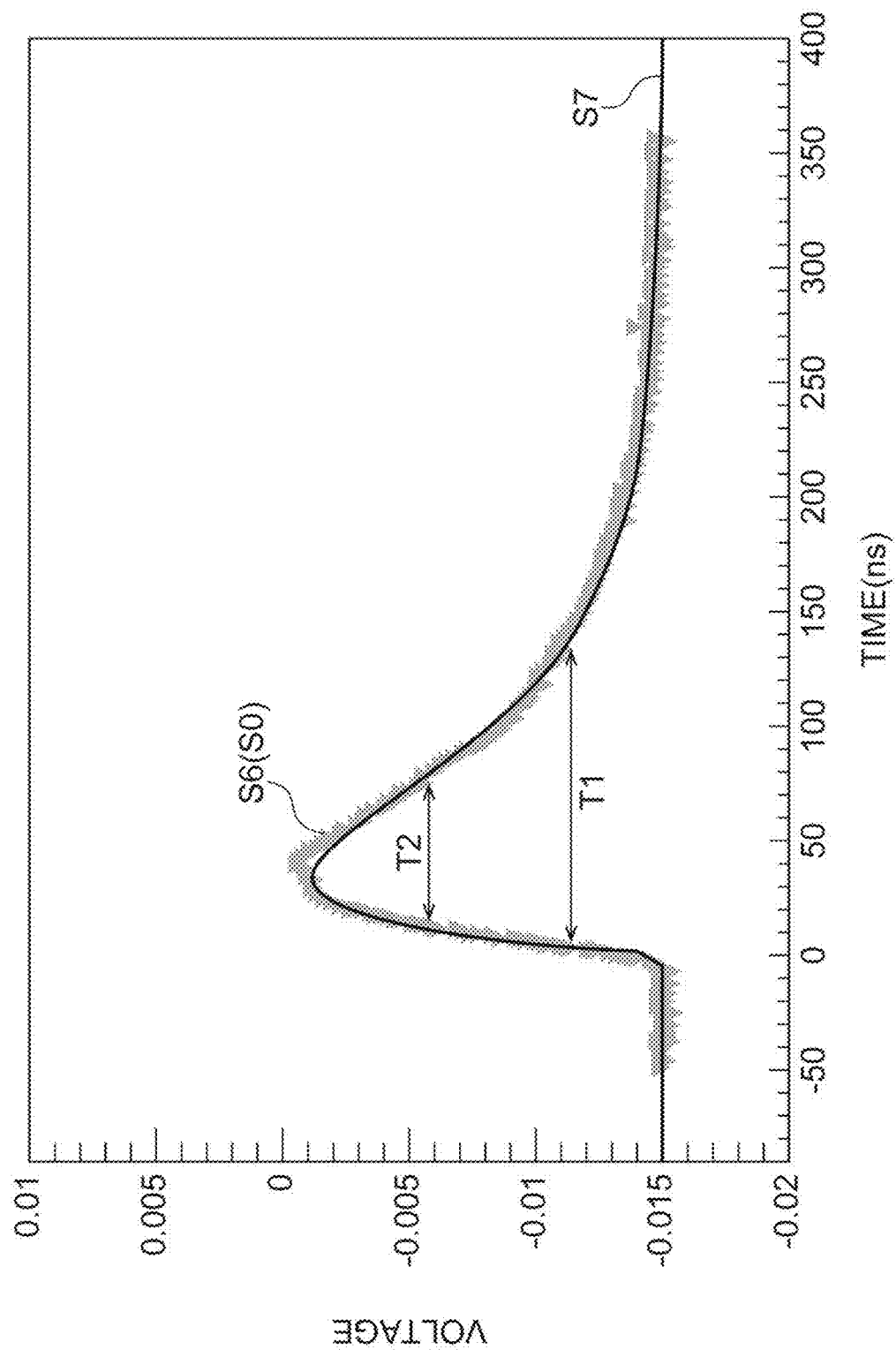
FIG. 10 is a graph illustrating the time waveform and the first and second time widths of the detection signal obtained in the measurement experiment illustrated in FIG. 9.

FIG. 10 is a graph illustrating the time waveform and the first and second time widths T1 and T2 of the detection signal S0 obtained in the measurement experiment illustrated in FIG. 9. Here, the analysis unit 30 performed fitting to time waveform data S6 of the detection signal S0 obtained by the oscilloscope 38 with a theoretical formula, and a time waveform S7 was obtained as a fitting result. Further, numerical analysis was performed for the time waveform S7 by setting the first and second threshold voltages V1 and V2 to obtain the first time width T1 and the second time width T2. Further, the time constant τ of the detection signal S0 was obtained based on the first and second time widths T1 and T2.

Figure 11:
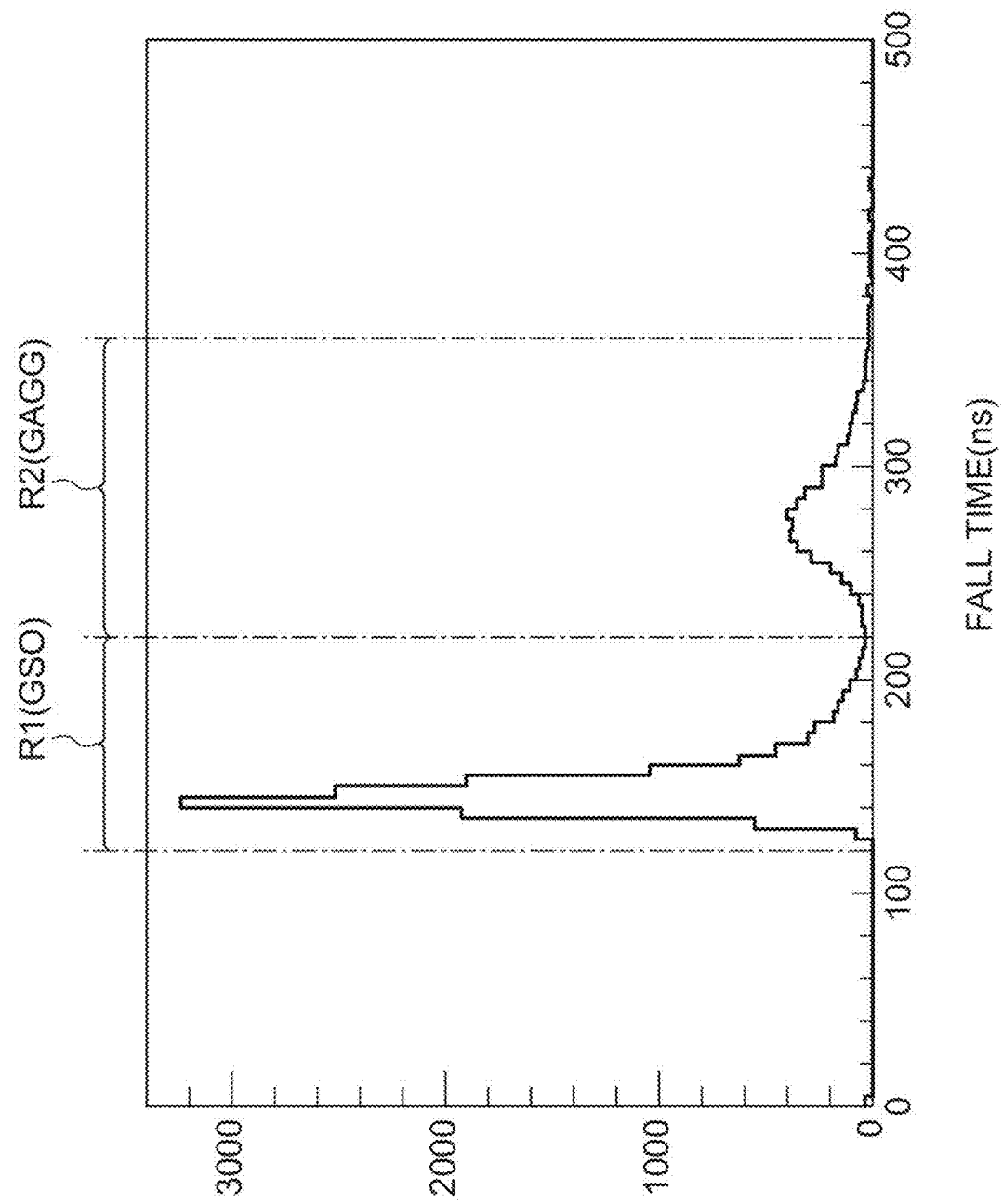
FIG. 11 is a graph illustrating determination of a scintillator unit based on a time constant of the detection signal obtained in the measurement experiment illustrated in FIG. 9.

FIG. 11 is a graph illustrating determination of the scintillator unit based on the time constant τ of the detection signal S0 obtained in the measurement experiment illustrated in FIG. 9. In the graph of FIG. 11, the horizontal axis indicates the fall time τd (ns) of the detection signal S0 obtained as the time constant τ. In the experimental result illustrated in FIG. 11, the detection data by the GSO scintillator distributed in a region R1 in which the fall time τd is short and the detection data by the GAGG scintillator distributed in a region R2 in which the fall time τd is long can be clearly determined. Such a determination function of the scintillator can be applied to, for example, determining scintillator units in a phoswich type detector configured by stacking a plurality of types of scintillator units having different time constants of a detection signal, and thus, it is possible to achieve a detection device capable of supporting a high count rate and reducing power consumption.

Figure 12:
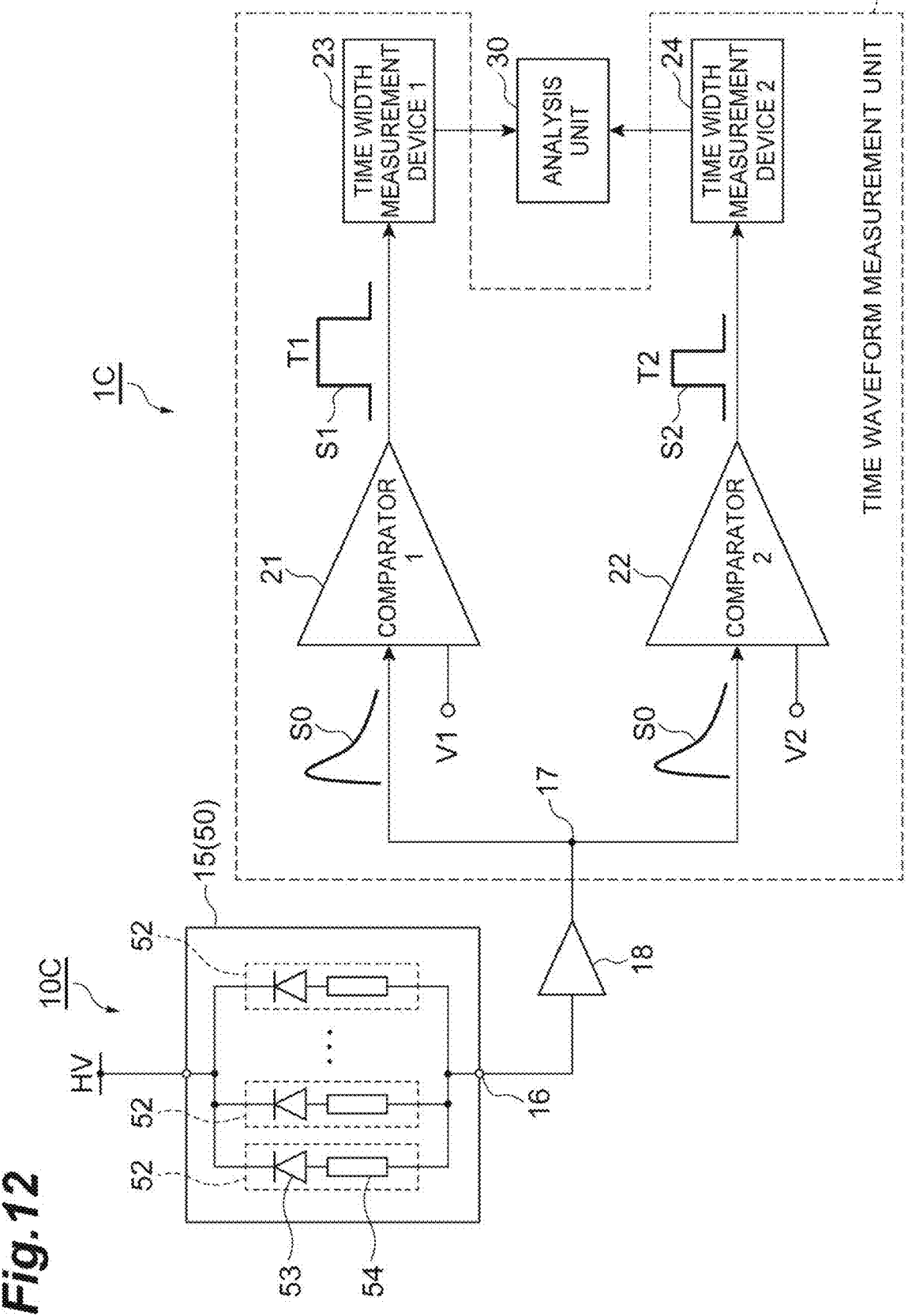
FIG. 12 is a diagram schematically illustrating a configuration of a radiation detection device of a third embodiment.

FIG. 12 is a diagram schematically illustrating a configuration of a radiation detection device of a third embodiment. A radiation detection device 1C according to the present embodiment includes a radiation detector 10C, a time waveform measurement unit 20, and an analysis unit 30. Among these, the configurations of the time waveform measurement unit 20 and the analysis unit 30 are similar to those illustrated in FIG. 1. Further, in FIG. 12, a display unit 31 and a storage unit 32 connected to the analysis unit 30, and a scintillator 11 included in the radiation detector 10C are not illustrated.

Figure 13:
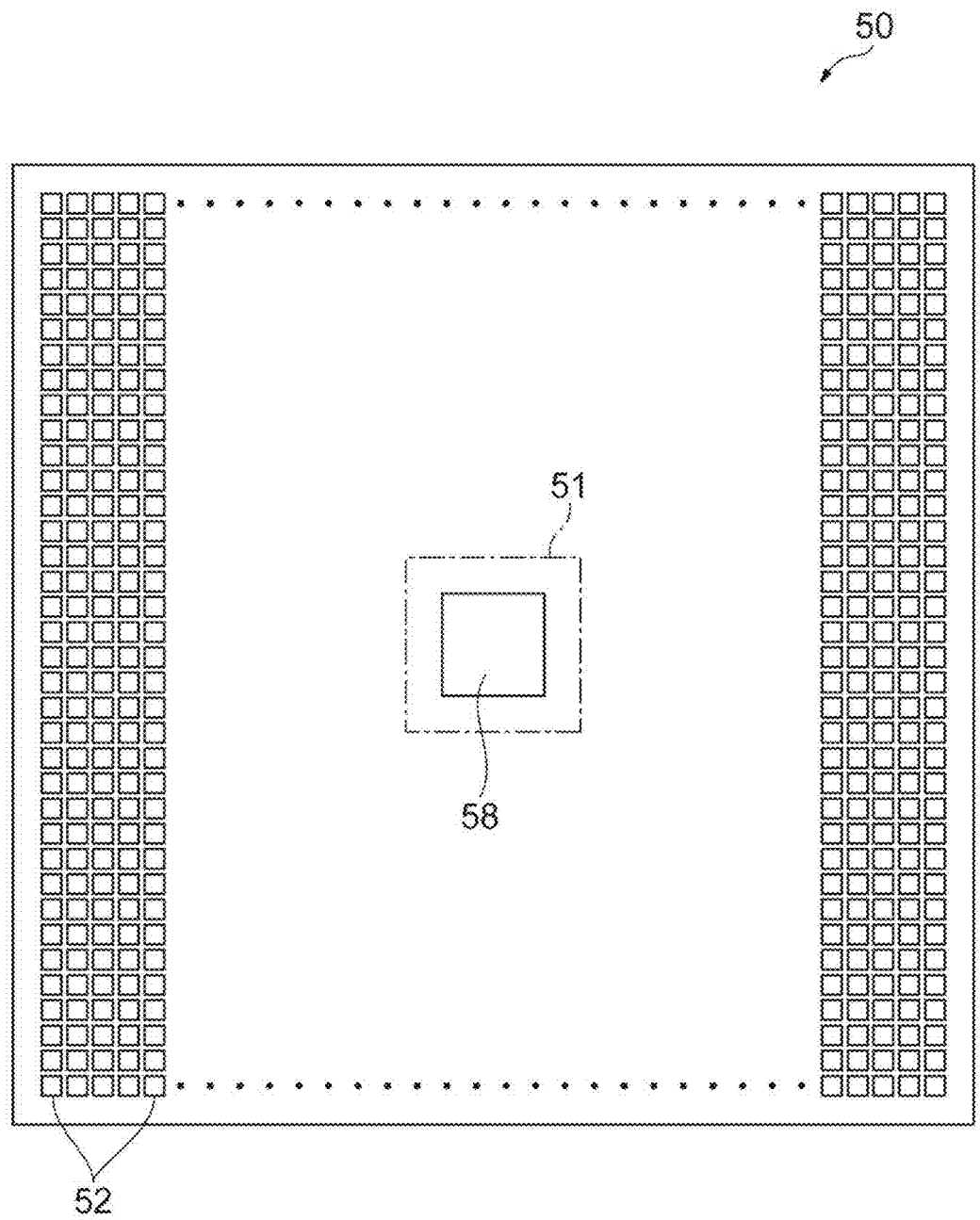
FIG. 13 is a plan view illustrating a configuration of a photodetector in the detection device illustrated in FIG. 12.
Figure 14:
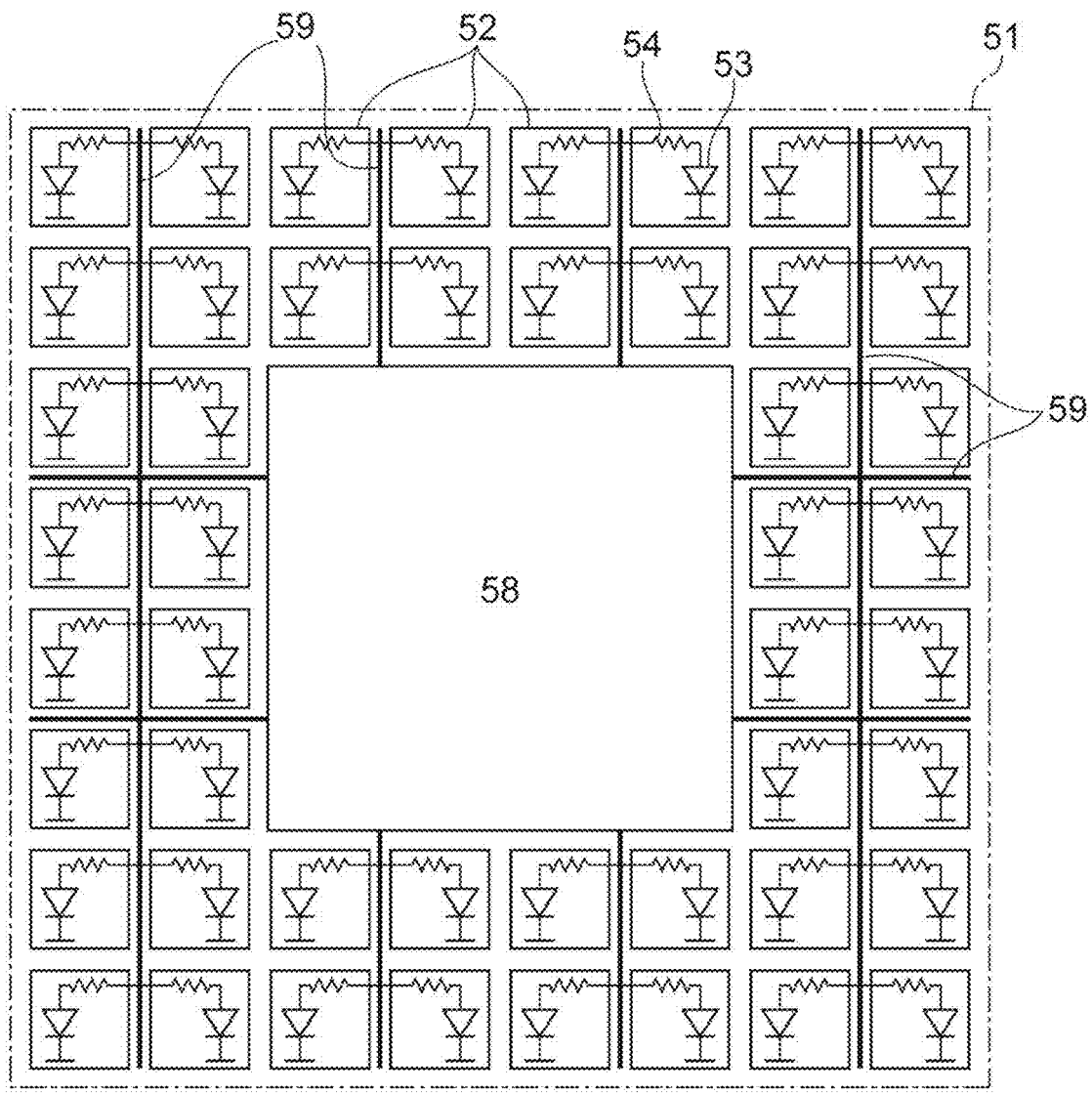
FIG. 14 is a plan view illustrating the configuration of the partially enlarged photodetector illustrated in FIG. 13.

The radiation detector 10C in this configuration example includes a scintillator 11 and a photodetector 15. Further, as the photodetector 15, a photodetector 50 configured as an MPPC including a plurality of photodetection pixels (photodetection units) is used. FIG. 13 is a plan view illustrating a configuration of the photodetector 50 in the radiation detection device 1C illustrated in FIG. 12. Further, FIG. 14 is a plan view illustrating the configuration of the partially enlarged photodetector 50 illustrated in FIG. 13. FIG. 14 is an enlarged view of a central region 51 of the photodetector 50 illustrated in FIG. 13.

The photodetector 50 includes N photodetection pixels (micropixels) 52 that are arranged one-dimensionally or two-dimensionally and each generate a detection signal S0 in response to incidence of light, and a single output terminal 16 that outputs the detection signal S0 generated in each of the N photodetection pixels 52 to the outside. Here, N is an integer of 2 or more. Further, regarding a specific configuration of the MPPC, Patent Document 1 can be referred to, for example.

In the configuration example illustrated in FIG. 13 and FIG. 14, the N photodetection pixels 52 are two-dimensionally arranged on the detector chip of the photodetector 50. Further, at the center of the detector chip, a common electrode 58 for collecting the detection signals S0 from the photodetection pixels 52 is disposed. In addition, in FIG. 13, the photodetection pixels 52 are illustrated only in the vicinity of both ends of the detector chip in order for the common electrode 58 to be easily recognized and the like.

Each of the N photodetection pixels 52 of the photodetector 50 includes an avalanche photodiode (APD) 53 that operates in Geiger mode, and a quenching resistor 54 connected in series to the APD 53. Further, the quenching resistor 54 is connected to the common electrode 58 via a signal line 59 as illustrated in FIG. 14. The detection signal S0 generated by each photodetection pixel 52 is output from the output terminal 16 to the outside via the signal line 59 and the common electrode 58.

Further, the N photodetection pixels 52 of the photodetector 50 are configured to output detection signals S0 having time waveforms different from each other (time constants different from each other). Specifically, in the present configuration example, the photodetector 50 is configured such that the quenching resistors 54 that determine, in the N photodetection pixels 52, the time waveforms and time constants of the detection signals have resistance values different from each other.

Figure 15:
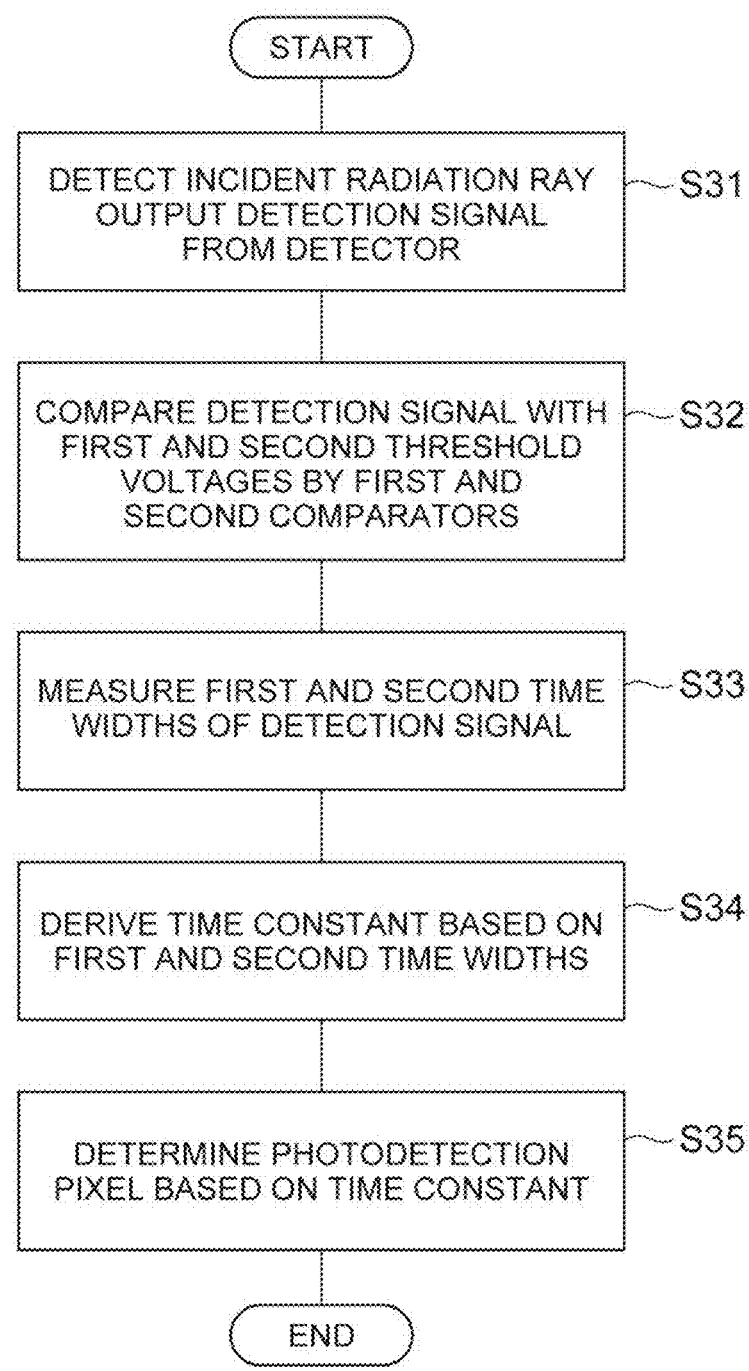
FIG. 15 is a flowchart illustrating a radiation detection method in the detection device illustrated in FIG. 12.

FIG. 15 is a flowchart illustrating a radiation detection method performed in the radiation detection device 1C illustrated in FIG. 12. In the radiation detection method illustrated in FIG. 15, first, a radiation ray is detected by the radiation detector 10C constituted by the scintillator 11 and the photodetector 50 including the N photodetection pixels 52, and a detection signal S0 is output from the output terminal 16 of the photodetector 50 (step S31).

The detection signal S0 is input to the first and second comparators 21 and 22 in the time waveform measurement unit 20 via the amplifier 18 and the branch point 17. The first comparator 21 compares the detection signal S0 with the first threshold voltage V1 and outputs the first digital signal S1 having the first time width T. Further, the second comparator 22 compares the detection signal S0 with the second threshold voltage V2 and outputs the second digital signal S2 having the second time width T2 (step S32). The first and second time widths T1 and T2 are respectively measured by the first and second time width measurement devices 23 and 24 (step S33).

The analysis unit 30 derives the time constant τ indicating the time waveform of the detection signal S0 based on the first and second time widths T1 and T2 measured by the first and second time width measurement devices 23 and 24 (step S34). Further, the analysis unit 30 determines, based on the obtained time constant τ, which one of the N photodetection pixels (photodetection units) has output the detection signal S0 (step S35).

In this manner, with the configuration for obtaining the time constant τ of the detection signal S0 based on the first and second time widths T1 and T2 as described above, it is possible to determine, based on the obtained time constant τ, which one of the N photodetection pixels 52 has output the detection signal S0, in the case where the photodetector 50 includes the N photodetection pixels (photodetection units) 52.

In addition, in this configuration example, the photodetector 50 includes the N photodetection pixels 52 as described above, and the number of the photodetection pixels (photodetection units) 52 is arbitrarily set to two or more. For example, when the photodetector 50 includes a first photodetection unit that outputs a detection signal having a predetermined time waveform, and a second photodetection unit that outputs a detection signal having a time waveform different from that of the first photodetection unit, it is possible to determine, based on the obtained time constant τ, whether the detection signal S0 is output from the first photodetection unit or the second photodetection unit.

Further, regarding the configuration of the N photodetection pixels 52 of the photodetector 50 that output detection signals having time waveforms different from each other, various configurations other than the configuration illustrated in FIG. 12 is applicable.

Figure 16:
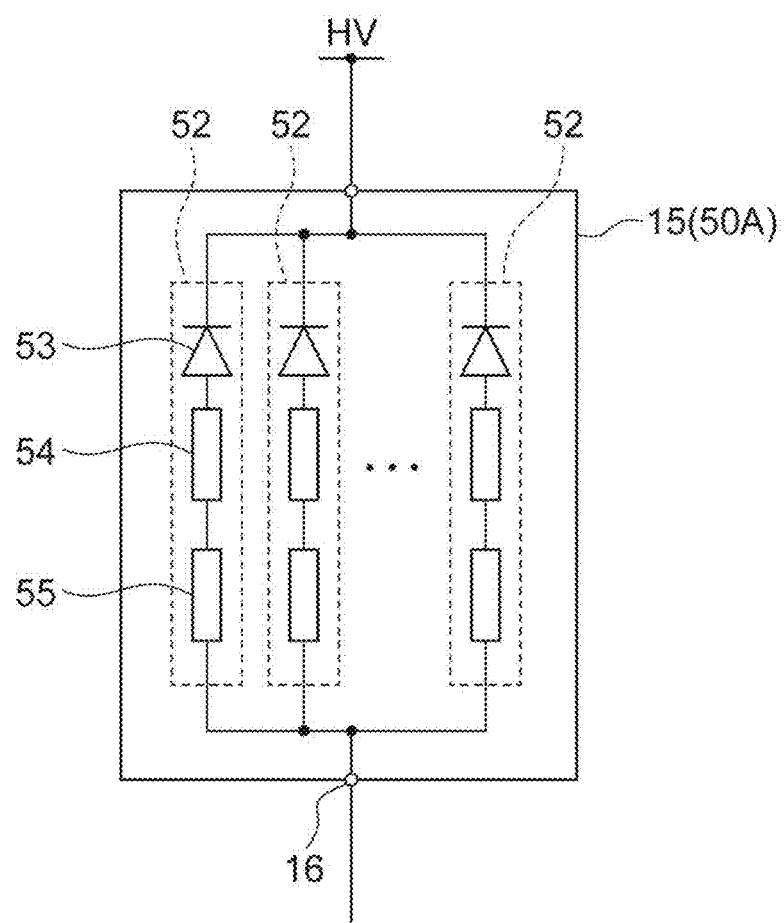
FIG. 16 is a diagram schematically illustrating a configuration of a first modification of the photodetector in the detection device illustrated in FIG. 12.

FIG. 16 is a diagram schematically illustrating a configuration of a first modification of the photodetector 15 in the radiation detection device 1C illustrated in FIG. 12. In the present configuration example, the photodetector 15 is configured as a photodetector 50A including N photodetection pixels 52 and a single output terminal 16.

Each of the N photodetection pixels 52 of the photodetector 50A includes an APD 53 that operates in Geiger mode, a quenching resistor 54 connected in series to the APD 53, and a frequency filter 55 connected in series between the quenching resistor 54 and the output terminal 16.

Further, in this configuration example, the photodetector 50A is configured such that the frequency filters 55 of the N photodetection pixels 52 have frequency characteristics different from each other. Thus, the N photodetection pixels 52 of the photodetector 50A output detection signals S0 having time waveforms different from each other. The frequency filters 55 of the N photodetection pixels 52 are, for example, high-pass filters, low-pass filters, or band-pass filters having cutoff frequencies different from each other.

Figure 17:
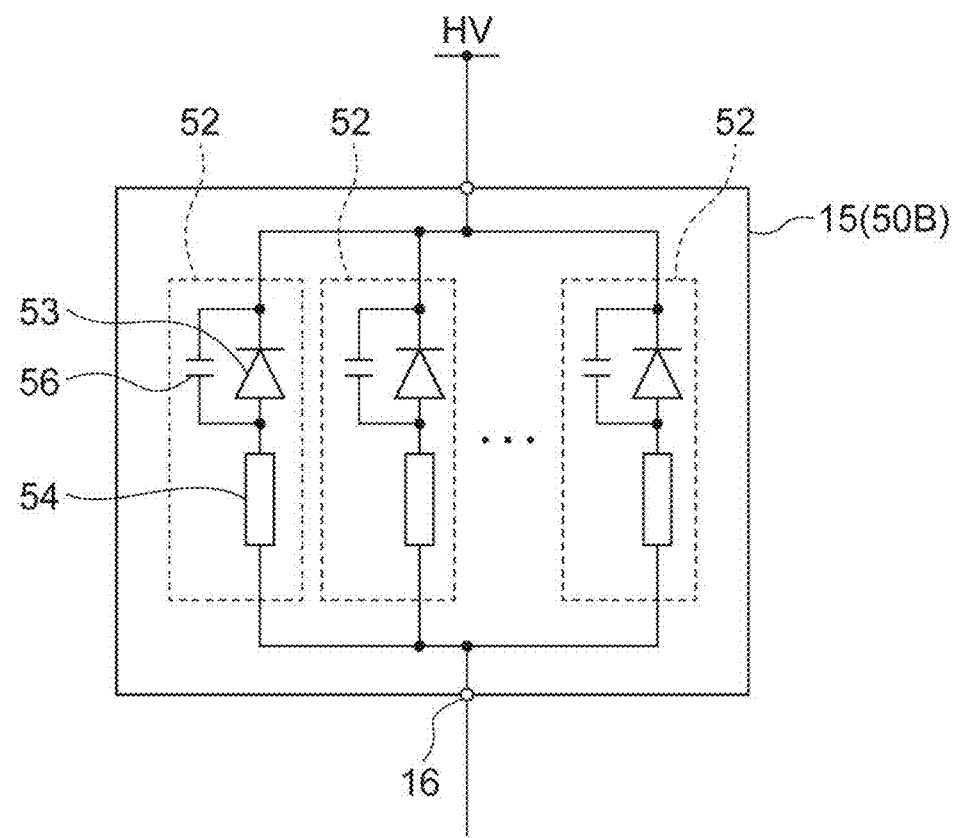
FIG. 17 is a diagram schematically illustrating a configuration of a second modification of the photodetector in the detection device illustrated in FIG. 12.

FIG. 17 is a diagram schematically illustrating a configuration of a second modification of the photodetector 15 in the radiation detection device 1C illustrated in FIG. 12. In the present configuration example, the photodetector 15 is configured as a photodetector 50B including N photodetection pixels 52 and a single output terminal 16.

Each of the N photodetection pixels 52 of the photodetector 50B includes an APD 53 that operates in Geiger mode, a quenching resistor 54 connected in series to the APD 53, and a capacitor 56 connected in parallel to the APD 53.

Further, in this configuration example, the photodetector 50B is configured such that the capacitors 56 of the N photodetection pixels 52 have capacitance values different from each other. Thus, the N photodetection pixels 52 of the photodetector 50B output detection signals S0 having time waveforms different from each other.

The radiation detection device according to the present invention is not limited to the above embodiments and configuration examples, and can be variously modified. For example, in the configurations illustrated in FIG. 7 and FIG. 12, the amplifier 18 is provided for the detection signal S0 output from the photodetector 15, however, this amplifier 18 may not be provided if unnecessary.

Further, regarding the time constant τ indicating the time waveform of the detection signal S0 obtained by the analysis unit 30, the fall time τd is used as the time constant τ in the above configuration example, but another parameter related to the time waveform may be obtained as the time constant τ as long as the time waveform of the detection signal S0 can be determined. Further, regarding the time width of the detection signal S0 used for deriving the time constant τ, the first and second time widths T1 and T2 are measured in the above configuration example, but three or more types of time widths may be measured, for example.

The radiation detection device of the above embodiment is configured to include (1) a scintillator for generating scintillation light in response to incidence of a radiation ray, (2) a photodetector for detecting the scintillation light output from the scintillator and outputting a detection signal, (3) a first comparator for comparing the detection signal with a first threshold voltage and outputting a first digital signal having a first time width corresponding to a time during which a voltage value of the detection signal exceeds the first threshold voltage, (4) a first time width measurement device for measuring the first time width of the first digital signal, (5) a second comparator for comparing the detection signal with a second threshold voltage different from the first threshold voltage and outputting a second digital signal having a second time width corresponding to a time during which the voltage value of the detection signal exceeds the second threshold voltage, (6) a second time width measurement device for measuring the second time width of the second digital signal, and (7) an analysis unit for obtaining a time constant indicating a time waveform of the detection signal based on the first time width and the second time width.

Here, in the above detection device, the scintillator may include a first scintillator unit for generating scintillation light having a predetermined time waveform, and a second scintillator unit for generating scintillation light having a time waveform different from that of the first scintillator unit. Further, in this case, the analysis unit may determine, based on the obtained time constant, whether the detection signal output from the photodetector is caused by the scintillation light generated in the first scintillator unit or the second scintillator unit. With this configuration, it is possible to reliably determine the scintillator unit based on the time constant of the detection signal.

Further, in the above detection device, the photodetector may include a first photodetection unit for outputting a detection signal having a predetermined time waveform, and a second photodetection unit for outputting a detection signal having a time waveform different from that of the first photodetection unit. Further, in this case, the analysis unit may determine, based on the obtained time constant, whether the detection signal is output from the first photodetection unit or the second photodetection unit. With this configuration, it is possible to reliably determine the photodetection unit based on the time constant of the detection signal.

Regarding a specific configuration of the detection device, each of the first time width measurement device and the second time width measurement device may include a time to digital converter. Thus, it is possible to appropriately measure the first and second time widths of the detection signal.

In the above detection device, a rise time $\tau r$ in the time waveform of the detection signal with a fall time $\tau d$ may satisfy a condition, $$(\tau r/\tau d)<0.1.$$

Further, in the above detection device, the analysis unit may obtain the time constant $\tau$ with a formula, $$\tau=(T1-T2)/\log(V2/V1)$$

where V1 is the first threshold voltage, T1 is the first time width, V2 is the second threshold voltage, and T2 is the second time width. With these configurations, it is possible to appropriately obtain the time constant $\tau$ of the detection signal.

Further, in the above detection device, the analysis unit may further obtain a pulse height of the time waveform of the detection signal based on the time constant. With this configuration, it is possible to appropriately obtain the pulse height of the detection signal without providing a pulse height measurement device separately from the time waveform measurement unit including the comparator and the time width measurement device.

INDUSTRIAL APPLICABILITY

The present invention can be used as a radiation detection device capable of appropriately acquiring and determining information on the time waveform of a detection signal output from a radiation detector including a scintillator and a photodetector.

REFERENCE SIGNS LIST 1A, 1B, 1C—radiation detection device, 10, 10B, 10C—radiation detector, 11—scintillator, 12—first scintillator unit, 13—second scintillator unit, 15—photodetector, 16—output terminal, 17—branch point, 18—amplifier, 20—time waveform measurement unit, 21—first comparator, 22—second comparator, 23—first time width measurement device, 24—second time width measurement device, 30—analysis unit, 31—display unit, 32—storage unit, 35—thermostatic chamber, 36—radiation source, 38—oscilloscope, 2A—PET apparatus, 60—signal processing unit, 50, 50A, 50B—photodetector, 51—region, 52—photodetection pixel, 53—avalanche photodiode (APD), 54—quenching resistor, 55—frequency filter, 56—capacitor, 58—common electrode, 59—signal line, S0—detection signal, Sp—signal peak, Sr—signal rising part, Sd—signal falling part, S1—first digital signal, S2—second digital signal, V1—first threshold voltage, V2—second threshold voltage, T1—first time width, T2—second time width.

The invention claimed is:
1. A radiation detection device comprising:
a scintillator configured to generate scintillation light in response to incidence of a radiation ray;
a photodetector configured to detect the scintillation light output from the scintillator and output a detection signal;
a first comparator configured to compare the detection signal with a first threshold voltage and output a first digital signal having a first time width corresponding to a time during which a voltage value of the detection signal exceeds the first threshold voltage;
a first time width measurement device configured to measure the first time width of the first digital signal;
a second comparator configured to compare the detection signal with a second threshold voltage different from the first threshold voltage and output a second digital signal having a second time width corresponding to a time during which the voltage value of the detection signal exceeds the second threshold voltage;
a second time width measurement device configured to measure the second time width of the second digital signal; and
an analysis unit configured to obtain a time constant indicating a time waveform of the detection signal based on the first time width and the second time width.
2. The radiation detection device according to claim 1, wherein the scintillator includes:
a first scintillator unit configured to generate scintillation light having a predetermined time waveform; and
a second scintillator unit configured to generate scintillation light having a time waveform different from that of the first scintillator unit.

3. The radiation detection device according to claim 2, wherein the analysis unit is configured to determine, based on the time constant, whether the detection signal output from the photodetector is caused by the scintillation light generated in the first scintillator unit or the second scintillator unit.

4. The radiation detection device according to claim 1, wherein the photodetector includes:
   a first photodetection unit configured to output a detection signal having a predetermined time waveform; and
   a second photodetection unit configured to output a detection signal having a time waveform different from that of the first photodetection unit.

5. The radiation detection device according to claim 4, wherein the analysis unit is configured to determine, based on the time constant, whether the detection signal is output from the first photodetection unit or the second photodetection unit.

6. The radiation detection device according to claim 1, wherein each of the first time width measurement device and the second time width measurement device includes a time to digital converter.

7. The radiation detection device according to claim 1, wherein a rise time $\tau r$ in the time waveform of the detection signal with a fall time $\tau d$ satisfies a condition, $$(\tau r/\tau d)<0.1.$$

8. The radiation detection device according to claim 1, wherein the analysis unit is configured to obtain the time constant $\tau$ with a formula, $$\tau = (T1-T2)/\log(V2/V1)$$

where V1 is the first threshold voltage, T1 is the first time width, V2 is the second threshold voltage, and T2 is the second time width.

9. The radiation detection device according to claim 1, wherein the analysis unit is configured to obtain a pulse height of the time waveform of the detection signal based on the time constant.

* * * * *